United States Patent [19]

Jones

[11] 4,364,409

[45] Dec. 21, 1982

[54] FLUID FLOW CONTROL DEVICE

[76] Inventor: James S. Jones, 45 Crown Pl., Richardson, Tex. 75080

[21] Appl. No.: 178,767

[22] Filed: Aug. 18, 1980

[51] Int. Cl.$^3$ ............................................. G05D 7/01
[52] U.S. Cl. .................................... 137/486; 251/209
[58] Field of Search ................. 137/486, 501; 251/209

[56] References Cited

U.S. PATENT DOCUMENTS

| | | | |
|---|---|---|---|
| 863,264 | 8/1907 | Connet | 137/486 |
| 991,641 | 5/1911 | Plantinga | 137/501 X |
| 1,538,427 | 5/1925 | Earl | 137/486 X |
| 1,640,842 | 8/1927 | Loomis | 137/501 |
| 1,745,059 | 1/1930 | Rush | 137/486 |
| 2,510,514 | 6/1950 | Mueller | 251/209 |
| 2,633,869 | 4/1953 | Plank | 137/486 |
| 2,644,482 | 7/1953 | McCallum | 137/501 |
| 3,346,006 | 10/1967 | Horton | 137/501 |
| 3,395,726 | 8/1968 | Cross | 137/486 X |
| 4,210,171 | 7/1980 | Rikuta | 137/501 |

*Primary Examiner*—Robert G. Nilson
*Attorney, Agent, or Firm*—Richards, Harris & Medlock

[57] ABSTRACT

A device for controlling flow of a pressurized fluid including conduit means for conveying the fluid without substantial directional deviation in the direction of flow. Metering means is disposed in said conduit means for control of the flow of said fluid. A throttle piston is movable into and out of the conduit means and is responsive to the flow of the fluid for maintaining a constant pressure drop across the metering means for any given setting of the metering means. The metering means includes a pierced cylindrical valve body rotatable on an axis transverse to the axis of the conduit means with two scale index structures attached thereto for indicating adjustment of flow rates appropriate to either of two source pressures.

9 Claims, 6 Drawing Figures

FLUID FLOW CONTROL DEVICE

TECHNICAL FIELD

This invention relates to devices for controlling the flow of fluids, and more particularly, to a control device for metering the delivery of anhydrous ammonia.

BACKGROUND ART

Anhydrous ammonia is the nitrogen source for most of the synthetic fertilizers and is widely used in its natural state for pre-plant nitrogen on some of the larger grain crops—corn, milo, sorghum, etc. A farmer in the corn belt has two choices for application; one in the fall after the weather has turned cold. The other just as soon as the soil thaws in the spring.

Anhydrous ammonia stored in a pressure vessel is in the liquified gas phase, a liquid due to its own vapor pressure. Any heat flow into the system will be absorbed in the system by additional formation of vapor, increasing the system pressure. Heat flow out of the system will produce condensation of the vapor reducing the system pressure.

The application and distribution of ammonia for fertilizer is usually accomplished by a tractor equipped with a tool bar or cultivator with means to meter and place the fertilizer in rows 4" to 8" beneath the soil surface, means to seal the soil and an ammonia wagon in tow with suitable flexible connections to transfer the ammonia from the ammonia tank through the meter on the tool bar.

The energy required to move the ammonia through the system is supplied by the vapor pressure in the tank; however, the ammonia moving from the tank to the meter experiences a pressure drop equal to the pressure required to accelerate the liquid to its velocity through the system. This pressure drop requires a temperature drop in the system which is provided by refrigeration or vaporization within the system. The colder the day, the lower the pressure, the greater the percentage of vapor in the system prior to the meter.

Operators using the larger more powerful tractors available today, capable of pulling wider tool bars at greater speeds across the fields, have outrun the capacities of available ammonia placement system. Much of the late fall and early spring ammonia application is performed with ambient temperatures between 35° and 45° and vapor pressure of 5 atmospheres (approximately 60 PSIG). These are very undesirable metering conditions, and in too many instances, the farmer finds he must reduce his speed or make two passes to apply the desired quantity of fertilizer. Neither procedure is very economical.

While most of the metering devices in use today are capable of handling enough fertilizer with ambient temperatures around 75° and vapor pressure of 9 atmospheres (approximately 120 PSIG). With their internal resistance, abrupt turns, accelerating and decelerating the ammonia, they become little more than a portion of a conduit which transfers the fertilizer from the tank to the fields when used with the lower system pressures.

The early art used a tractor-mounted, self-contained applicator. The meter mounted on the withdrawal valve of the tank established a known fixed resistance from the liquid source to the meter. The use of temperature gradient meter dials were fairly successful with the speeds and swath widths required at that time.

As the tool bar concept replaced the applicators, moving the meter from the tank to the tool bar, the known resistance prior to metering became the unknown.

Under ideal soil conditions, the rate of application may be in excess of 30 gallons per minute or a 1,000 gallon wagon every 35 minutes. Meter setting charts are attached to the tool bar and with the swatch width fixed, the charts show tractor speed against pounds N per acre. With vapor pressures of 80 PSIG and up, the metering is fairly constant, but 60 PSIG and under, there is considerable variation and experienced operators under certain ambient conditions will change the meter setting two or three times with each tank. Therefore, a simple dial with the two pressure bases is a helpful tool, providing good control at the higher temperatures as well as a usable reference at the lower temperatures.

DISCLOSURE OF THE INVENTION

In accordance with the present invention, a fluid flow control device is provided for controlling the flow of a pressurized fluid. A conduit conveys the fluid without substantial deviation in the direction of the flow. Metering means are disposed in the conduit for sensing the flow of the fluid, and a throttle is disposed in the conduit responsive to the flow of the fluid for maintaining a constant pressure difference across the metering means.

In accordance with another aspect of the present invention, a device for controlling the flow of pressurized liquid ammonia from either of two pressure bases is provided with a straight bore extending through a housing for channeling the ammonia without substantial deviation from a straight line path. A metering valve is disposed in the bore for producing a pressure drop thereacross upon flow of the ammonia. A throttle piston is disposed in the bore downstream of the metering valve, and a control means in fluid communication with the bore upstream and downstream of the metering orifice operates the throttle piston to maintain the pressure drop at the predetermined value.

In accordance with yet anothr aspect of the present invention, a device for operating a ball valve positioned in the conduit is provided with a cylindrical valve stem rotatably positioned in a valve body and extending from the ball valve. A pinion is integrally formed with the valve stem. A rack is disposed in the valve body and engages and rotates the pinion. A hydraulically operated power means powers the rack to rotate the ball valve.

BRIEF DESCRIPTION OF DRAWINGS

A more complete understanding of the invention and its advantages will be apparent from the following Detailed Description taken in conjunction with the accompanying Drawings in which.

DETAILED DESCRIPTION

Figure 1:
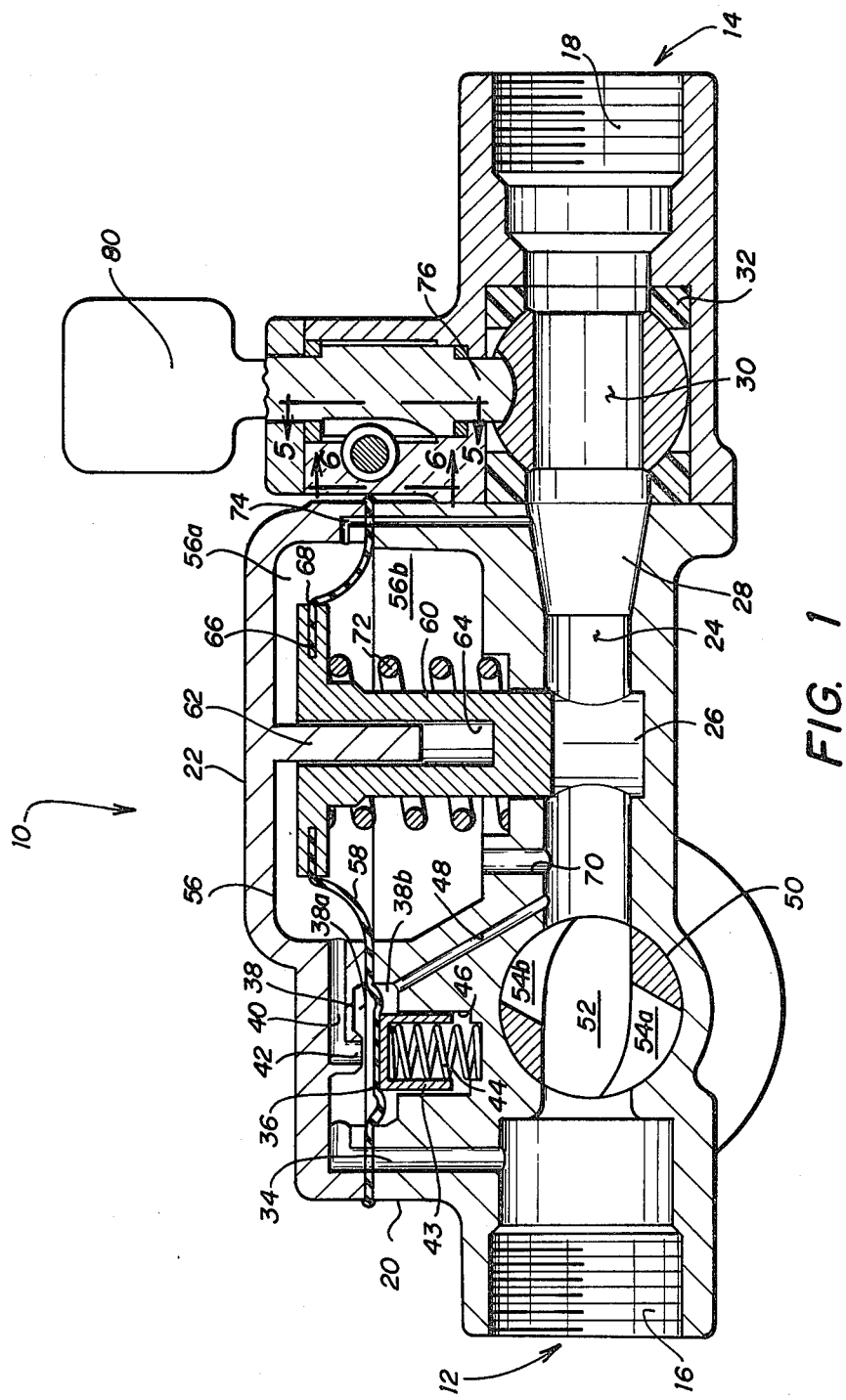
FIG. 1 is a sectional view of an embodiment of the present invention.

FIG. 1 illustrates a fluid flow control device 10. Ammonia is supplied at inlet 12 and exits through outlet 14. The ammonia is supplied to inlet 12 through a pipe (not shown) which is threaded into threads 16 of inlet 12. From control device 10, the ammonia flows through another pipe (not shown) which is threaded into threads 18 of outlet 14 for distribution.

The fluid flow control device 10 includes a housing 20 and a cover 22 with bore 24 extending from inlet 12 to outlet 14. Bore 24 forms the principal path for flow of ammonia through control device 10. Bore 24 extends through housing 20 without substantial deviation from a straight line path, thereby minimizing the internal resistance of the device 10 to flow.

A second bore 26 intersects bore 24 at right angles. Bore 24 flares at 28 to connect with a bore 30 in a ball valve unit 32. From ball valve 32, the conduit 24 leads to outlet 14.

A channel 34 leads from inlet 12 upstream from bore 24. Channel 34 provides a passage for the ammonia to a control diaphragm 36 which divides a chamber 38 into upper chamber half 38a and lower chamber half 38b. A channel 40 extends from a key valve seat 42 to chamber 38a. Diaphragm 36 cooperates with seat 42 to control flow from inlet 12 through channel 40 to an upper chamber 56a.

A piston 43 in chamber 38b is biased upward by spring 44. Piston 43 and spring 44 operate in a well 46 in chamber 38b normally to close seat 42.

Channel 48 communicates between lower chamber 38b and bore 24 downstream of a metering unit 50. Thus, diaphragm 36 responds to pressure on one side from channel 34 and on the other side from channel 48.

A metering valve 50 is disposed in housing 20. Metering valve 50 is in the form of a cylinder with a cylindrical bore 52 of the same size as bore 24 and extends transversely of the cylinder. Adjacent bore 52 are V-shaped channels 54a and 54b which extend into the bore 52. Thus, metering valve 50 has bore 52 and channels 54a, 54b to permit variable control of the flow of ammonia through the fluid control device 10. Metering valve 50 is manually rotatably positioned in housing 20. The rotational position of valve 50 determines in part, the amount of ammonia which flows through valve 50. Valve 50 is calibrated and operated with a predetermined pressure drop across it.

Channel 40 leads from upper chamber 38a to a second chamber 56 in housing 20. Diaphragm 58 divides chamber 56 into upper half 56a and lower half 56b.

A throttle piston 60, of cylindrical shape, is positioned in chamber 56 and is movable in bore 26 to open and close bore 24. A tang 62 is operated in a well 64 in piston 60 to center piston 60 in bore 26 and chamber 56. Well 64 does not extend through piston 60, but is of shorter length than piston 60.

Piston 60 has a radially extending lip 66 with a groove 68 into which diaphragm 58 is secured. Piston 60 is biased upward by spring 72. In the upper position of piston 60 bore 24 is unobstricted. Channel 70 provides fluid communication between lower chamber half 56b and bore 24 downstream of valve 50 but upstream of piston 60. A restricted channel 74 extends from upper chamber half 56a to bore 24 downstream of piston 60. Accordingly, diaphragm 58 responds to pressures through channel 40 on one side, and channel 70 on the other.

A ball valve 32 is positioned downstream of piston 60 to provide on-off flow control. Ball valve 32 is disposed in housing 20 and has upstanding valve stem 76. Valve stem 76 is rotatably secured in housing 20. A rack 78 is transversely positioned in housing 20 and engages pinion structures on valve stem 76. Translation motion of rack 78 rotates valve stem 76 and ball valve 32 to open or close conduit 24. A flag 80 attached to the end of valve stem 76 signals the position of ball valve 32.

Figure 2:
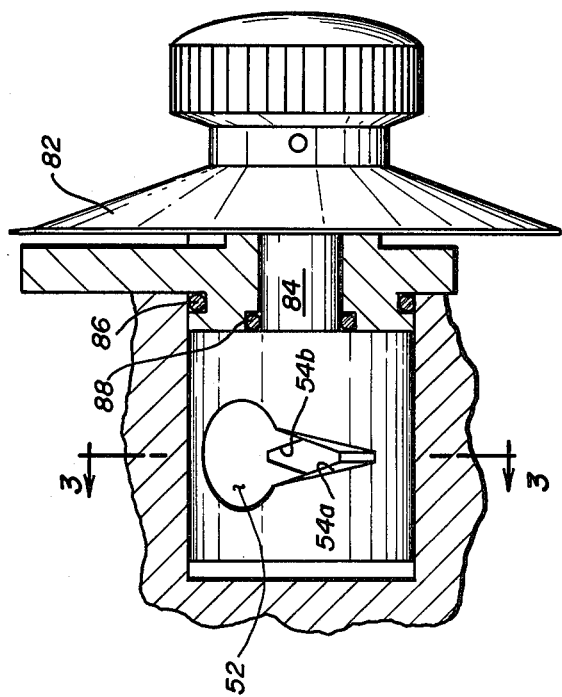
FIG. 2 is a cutaway view of the metering valve.

FIG. 2 is a side view of the metering valve 50. Valve 50 has a dial 82 attached to a valve stem 84.

Figure 3:
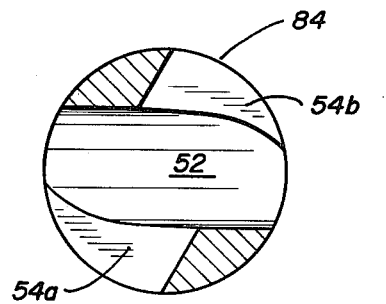
FIG. 3 is a view of the metering valve taken along the lines 3—3 of FIG. 2.

Valve 50 has a cylindrical bore 52 therethrough. Extending from bore 52 are V-shaped notches 54a and 54b. Channels 54a and 54b are identical and taper from a maximum width at the surface of cylindrical body 84 until they merge with walls of bore 52, as most clearly seen in FIGS. 1 and 3. V-shaped notches 54a, 54b are diametrically opposite each other in cylindrical body 84 of valve 50.

Valve 50 is provided with O-ring seals 86 and 88 to maintain the integrity of conduit 24.

Figure 4:
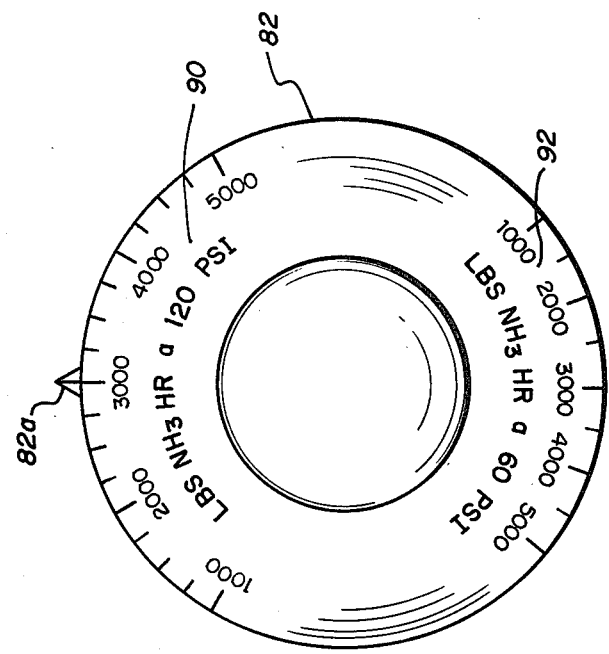
FIG. 4 illustrates the calibrations of the metering valve.

FIG. 4 illustrates calibration dial 82 which is provided for manual control of valve 50. The calibrations 90, 92 may be employed to set the flow rate for either of two different pressure bases. As illustrated, calibration 92 is to be used for 60 pounds per square inch pressure source and calibration 90 is to be used when a 120 pounds per square inch source is used. Dial 82 could be calibrated for other source pressures. It is a simple matter to turn the dial 82 for a given pressure base to operate relative to index marker 82a to dispense ammonia at the selected rate. In operation, a source of pressurized ammonia is attached to inlet 12. Dial 82 is adjusted for the devised rate of flow for a given pressurized source, thereby to set the rate of release. The controls for piston 60 then serve to maintain a predetermined pressure drop across valve 50 when ball valve 30 is rotated to the open position to permit the ammonia to flow through bore 30 for delivery application placing equipment (not shown).

Ammonia flows through channel 34 into chamber 38 tending to open diaphragm valve 36. Ammonia flows through channel 40 into upper chamber 56a and into bore 24 through restricted channel 74. Back pressure due to the restricted size of channel 74 forces diaphragm 58 and piston 60 downward, thus, building pressure downstream of valve 50. The pressure in bore 24 downstream of metering valve 50 is applied to the underside of diaphragm valve 36 through channel 48. Pressure in bore 24 is applied to the underside of diaphragm 58 through channel 70.

Entry of piston 60 into conduit 24 increases the pressure upstream of piston 60. This increase in pressure acts through channels 48 and 70 on the underside of diaphragms 58 and 36 in response to the increased pressure.

A decrease in pressure across valve 50 causes pressures in chambers 38b and 56b to increase. Diaphragms 36 and 58 then move upward to cause piston 60 to be withdrawn from conduit 24, thus restoring the pressure drop to the predetermined level.

Figure 5:
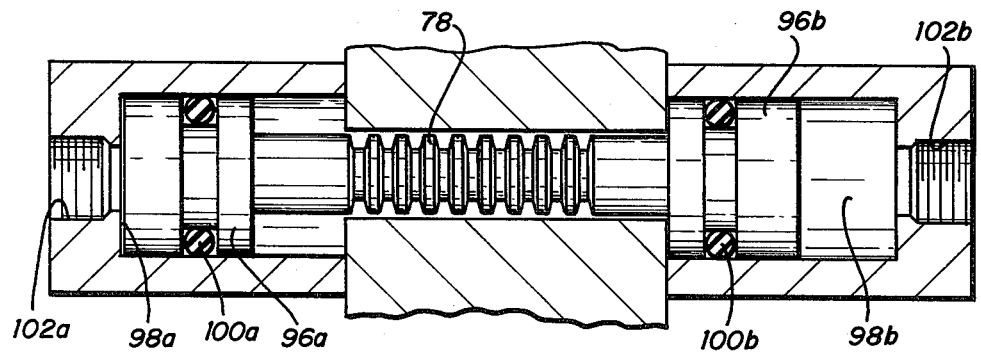
FIG. 5 is a side view of a ball valve actuating mechanism taken along the lines 5—5 of FIG. 1.
Figure 6:
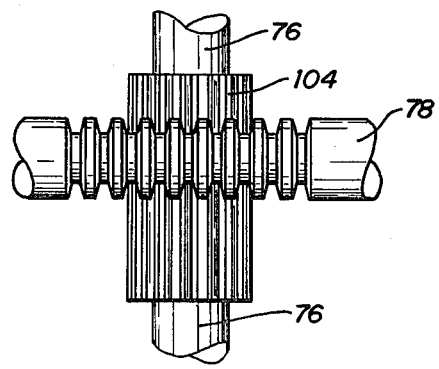
FIG. 6 is a view of a ball valve actuating mechanism taken along the lines 6—6 of FIG. 1.

Rack 78 meshes with a pinion for turning valve stem 76 to actuate ball valve 32. Rack 78 is transversely positioned in housing 20 adjacent the pinion portion of the valve stem 76. Rack 78 extends to contact pistons 96a and 96b constrained in chambers 98a, 98b. Seals 100a, 100b maintain the integrity of the chambers 98a, 98b. Hydraulic fluid is injected into chambers 98a, 98b through threaded ports 102a, 102b from a suitable source of hydraulic fluid (not shown). Actuation of piston 96a through the introduction of hydraulic fluid through port 102a drives piston 96a to the right, as seen in FIG. 5, moving rack 78 to rotate valve stem 76. Correspondingly, the introduction of hydraulic fluid through intake 102b forces piston 96b to move rack 78 to the left as seen in FIG. 5. The hydraulic fluid in chamber 98a is forced through port 102a when hydraulic fluid is forced into chamber 98b.

Pinion 104 is formed on valve stem 76. The rotation of ball valve 32 by one quarter turn moves it from the fully open position to the fully closed position. Accordingly, only about one-fourth of valve stem 76 need be provided withs teeth for the operation of the ball valve 32.

When it is desired to shut off the flow of ammonia through the control device 10, rack 78 is actuated by hydraulic pistons 96a or 96b to rotate valve stem 76 by pinion 104. Flag 80 attached to the end of valve stem 76 rotates to indicate the position of ball valve 32, particularly the open or closed position.

While only one embodiment of the present invention has been described in detail herein and shown in the accompanying drawings, it will be evident that various further modifications are possible without departing from the spirit and scope of the invention.

I claim:

1. A device for controlling the flow of a fluid delivered from a pressurized source comprising:
   a housing having a straight bore extending therethrough;
   a manually settable metering valve disposed in said bore, to select a flow rate;
   a piston movable into and out of said bore downstream of said metering valve; and
   first control means disposed in said housing in fluid communication with said bore upstream and downstream of said metering valve and second control means disposed in said housing in fluid communication with said bore upstream of said metering valve by way of said first control means and in direct communication with said bore downstream of said metering valve for driving said piston to maintain the pressure drop across said metering valve at a predetermined value.

2. A device for controlling the flow of ammonia from either of two pressurized sources comprising:
   a housing having a straight bore extending therethrough;
   a manually settable metering valve disposed in said bore, to select a flow rate;
   a piston movable into and out of said bore downstream of said metering valve; and
   control means in fluid communication with said bore upstream and downstream of said metering valve for driving said piston to maintain the pressure drop across said metering valve at a predetermined value wherein said control means comprises:
   a first channel in said housing extending from said bore upstream of said metering valve;
   a controlled valve in said channel, structure forming a first chamber in fluid communication with said channel divided by a diaphragm and responsive to pressures in said chamber to open said controlled valve,
   a second channel extending from said bore downstream of said metering valve and upstream of said piston and leading to said first chamber to close said controlled valve; and
   structure forming a second chamber in fluid communication with said first channel and with said second channel and containing a diaphragm for driving said piston in response to the pressure drop across said metering valve.

3. The device in claim 2 wherein said metering valve comprises:
   a cylinder rotatably disposed in said bore and an axis transverse to the axis of said bore;
   a metering bore through said cylinder transverse to the axis of said cylinder; and
   a pair of V-shaped notches in said cylinder tapering into said metering bore from opposite directions, said notches and said metering bore forming a passage for the flow of ammonia therethrough.

4. A device for controlling the flow of pressurized ammonia from either of two pressurized sources comprising:
   an elongated housing;
   a bore extending through said housing for flow of the ammonia without substantial deviation from a straight line path;
   a manually adjustable metering valve for producing a drop in the pressure of the ammonia and positioned in said bore;
   a spring biased piston movable into and out of said bore downstream of said metering valve;
   a diaphragm valve means disposed in said housing in fluid communication with said bore upstream and downstream of said metering valve; and
   piston actuating diaphragm means disposed in said housing in fluid communication with said bore upstream of said metering valve by way of said diaphragm valve means and in direct communication with said bore downstream of said metering valve for actuating said piston to maintain said pressure drop across said metering valve at said predetermined value.

5. The device in claim 4 wherein said metering valve comprises a ported cylinder transversely positioned in said bore.

6. The device in claim 5 wherein:
   a pair of V-shaped channels are disposed on diametrically opposite sides of said cylinder, each channel tapering into said bore.

7. The device in claim 4 wherein said diaphragm valve means comprises:
   a diaphragm dividing a first chamber in said housing into upper and lower halves with a first passage for fluid communication between said upper chamber half and said bore upstream of said metering valve and with a second passage for fluid communication between said lower half and said bore downstream of said metering valve;
   a channel leading from the upper half of said chamber including a valve controlled by said diaphragm in said first chamber; and
   a piston disposed in the lower half of said first chamber for biasing said diaphragm normally to close said valve.

8. The device in claim 4 wherein said actuating means comprises:
   a chamber in said housing enclosing at least a part of said piston;
   a spring biasing said piston away from said bore; and
   a diaphragm dividing said chamber into upper and lower halves and connected to said piston, and responsive to flow through said diaphragm valve for actuating said throttle.

9. The device in claim 8 and further comprising:
a first passage providing fluid communication between the lower half of said chamber and said bore upstream of said piston; and
a second passage providing fluid communication between the upper half of said chamber and said bore downstream of said piston.